United States Patent [19]

Leis

[11] 4,375,634

[45] Mar. 1, 1983

[54] WARNING LIGHT

[76] Inventor: Harvey Leis, 3050 North Hope St., Philadelphia, Pa. 19133

[21] Appl. No.: 39,949

[22] Filed: May 17, 1979

[51] Int. Cl.³ .............................................. B60Q 1/46
[52] U.S. Cl. .................................... 340/81 R; 340/50; 340/84; 340/87; 340/105; 340/118; 362/173; 362/246; 315/200 A
[58] Field of Search ................... 340/81 R, 84, 87, 50, 340/90, 105, 77, 118, 122, 123, 135, 321, 331; 362/74, 84, 173, 241, 246, 61; 350/168, 100, 101; 315/200, 201

[56] References Cited

U.S. PATENT DOCUMENTS

| 2,188,067 | 1/1940 | Trautner | 340/119 |
| 3,344,264 | 9/1967 | Perkins | 340/87 |
| 3,488,630 | 1/1970 | Decker et al. | 340/81 R |
| 3,875,561 | 4/1975 | Scarpino et al. | 340/81 R |
| 4,003,040 | 1/1977 | Browand | 340/331 |

Primary Examiner—James J. Groody
Assistant Examiner—Donnie L. Crosland
Attorney, Agent, or Firm—Stuart E. Beck

[57] ABSTRACT

A warning light which has a dome-shaped lens containing a xenon stroboscopic bulb and a halogen cycle bulb. The bulbs are energized, either separately or at the same time, to provide two types of warning lights, while means are provided for minimizing the amount of light that escapes through the top of the dome.

4 Claims, 3 Drawing Figures

WARNING LIGHT

This invention relates to a warning light and more particularly to a warning light of the type that is to be mounted on emergency vehicles.

It is well recognized that police, fire and other emergency vehicles require warning lights which are visible both at night and during the day.

Typically, the warning lights appear to flash on and off at regular intervals to call attention to themselves. One way in which the appearance of flashing has been accomplished is by rotating a bulb within the light. As the bulb rotates into and out of view, the light appears to go on and off.

In recent years, the rotating bulb has been replaced in many applications by the use of stroboscopic lights. Typically, the stroboscopic lights may be comprised of elongated tubes that are filled with an inert gas such as xenon. The tubes may comprise part of a capacitor discharge circuit such as an oscillator circuit that gives a series of bursts of intensely bright light for a few hundredths of a second over a short period of time.

However, the rotating and stroboscopic lights, while providing an adequate warning, offer disadvantages in that they provide inadequate light for illumination of the emergency vehicle or other item on which they are supported. Still further, the flashing stroboscopic light may be highly unsettling to observers and can be a cause of anxiety and tension to the extent that it may interfere with rescue operations.

Further, with lenses of the type known in the prior art, a substantial amount of light is lost through the top of the lens thereby reducing the quantity and intensity of the light which can be transmitted through the sides of the lens for warning and illumination purposes.

It would be desirable to provide a warning light having a high degree of reliability while providing an intense warning light that illuminates the vehicle on which it is mounted without the anxiety and tension-causing flashes that the stroboscopic light, by itself causes while also minimizing the light lost through the top of the lens.

With the foregoing in mind, this invention relates generally to a warning light that includes first and second light sources which are mounted on a base with a translucent lens overlying them. One of the light sources is operative to provide a continuous light of variable intensity while the second light source is operative to provide an intermittent light. Means are provided for energizing the first and second light sources.

Further, the warning light includes means on the lens for reflecting light back into the lens so that light that would be lost through its top wall is projected through its sides.

In another aspect, the invention relates to a translucent generally dome-shaped lens for a warning light comprising a base, a frustoconical side wall and a top wall wherein means are provided on the top wall for reflecting light back into the dome so that the light that would be lost through the top wall is projected through the sides of the dome.

Reference is now made to the accompanying drawing wherein a presently preferred embodiment of the invention is illustrated and wherein FIG. 1 is a section view of a warning light constructed in accordance with the present invention.

Figure 1:
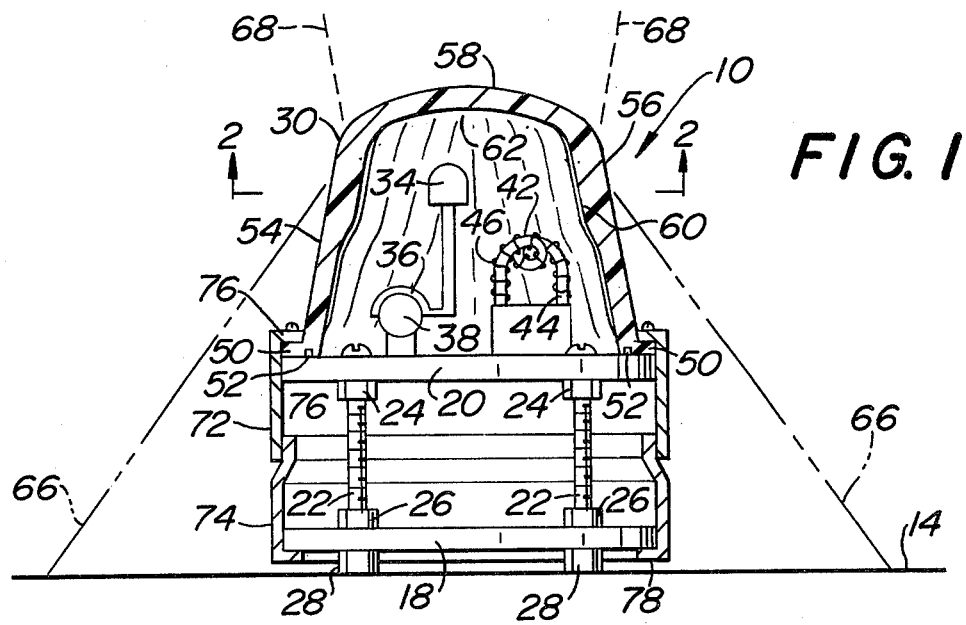

Referring to FIG. 1, a warning light 10 is illustrated as being mounted on a surface 14 which may be the roof of a police or fire emergency vehicle, tow truck, ambulance or the like.

Preferably, the warning light comprises a base plate 18 which may be made from a suitable material such as aluminum and which is generally circular in configuration. Spaced from the base plate is an upper plate 20 which may be of the same material and have the same shape as the base plate 18.

The upper plate 20 and the base plate 18 are held in spaced relation from each other by a plurality of elongated members 22. Preferably, the elongated members are bolts which are secured to the upper plate 20 by nuts 24 and to the base plate by nuts 26 and 28.

A suitable light source and a lens 30 may be mounted on the upper surface of the upper plate 20. The light source may comprise two light means. One of them may be a bulb 34 of the type that comprises a tungsten filament in a high temperature glass or quartz bulb. The bulb contains a gas and a halogen vapor. Usually the halogen vapor is iodine, bromine, chlorine or fluorine while the gas is argon, nitrogen or krypton. Bulbs of this type are usually called halogen cycle bulbs and are readily available on the open market. A suitable bulb is available from the General Electric Company as its part number 7695.

The halogen cycle bulb may be supported by a clip 36 which is connected by way of an element 38 to the upper plate 20.

The other light means may be a stroboscopic light 42 of the type described above. It may comprise a xenon-filled tube 44 which is surrounded by a trigger wire 46. The tube may have a loop formed intermediate its ends. The loop increases the effective length of tube and thereby increases the amount of light generated.

A suitable stroboscopic bulb is sold on the open market by the Sylvania Division of General Telephone and Electronics Corporation as Sylvania bulb number 4321.

The lens 30 may be a generally frustoconical member which is comprised of a translucent, preferably thermoplastic material. A suitable material is sold under the trademark "LEXAN". The lens may be made in a variety of different colors in accordance with the use which is to be made of it. Typically, the lenses are amber, red, blue and clear. The lens has an open bottom and is surrounded, at its base, by an outwardly extending annular flange 50. The lower surface of the flange 50 includes a circular recess in which an "O" ring seal 52 is disposed. The sides 54 of the lens slope upwardly and are generally rounded as at 56 to form a generally shallow curved top surface 58 so that the lens has a generally dome-like configuration.

Suitable means may be provided on the inner surface of sides 52 to assist in the focusing of the light which is emanated therefrom. Preferably, such means comprises a plurality of radially inwardly directed, elongated ribs 60 which are disposed in regular spaced relation around the inner periphery of the sides 54 of the lens.

Figure 2:
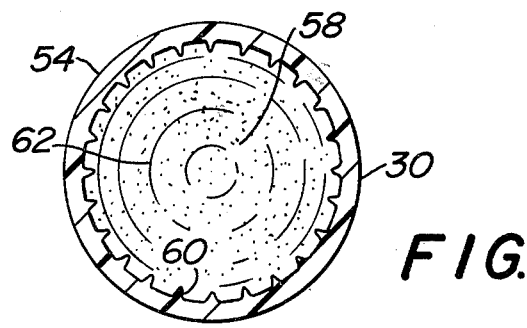
FIG. 2 is a section view taken along line 2—2 of FIG. 1.

In order to minimize the amount of light which is lost through the top of the lens, suitable reflective means 62 is provided on the inner surface of the top 58. The means may comprise a layer of mirror-like material. However, it is presently preferred that the inner surface of the lens be treated during manufacture to provide a frosted surface as best seen in FIG. 2. The frosting tends to break-up light which is directed upwardly and reflect a substantial portion of it back into the lens so that it passes out through the sides. Thus, the major source of light emanating from the strobe 42 and the halogen cycle bulb 34 emanates from the sides of the lens as indicated by the lines 66 while only a minor portion emanates from the top as indicated by lines 68.

The warning light is closed and the lens is secured to upper plate 20 by means of an upper bezel 72 and a lower bezel 74. The lens may be made watertight when the "O" ring 52 is sealed against plate 20. The upper bezel 72 has an inwardly directed annular flange 76 which overlies the upper surface of flange 50 of the lens. Suitable screw apertures may be provided for securing the upper bezel to the lens and plate 20.

The lower bezel 74 is an annular member having an inwardly spaced and upwardly directed leg 76 and, at its bottom, an inwardly directed annular flange 78. The flange 78 may have suitable screw holes in it at intervals which are alignable with apertures in the base plate 18 to secure the lower bezel to the underside of the plate 18.

The upper and lower bezels, when secured to the flange 50 and the base plate 18, respectively, completely enclose the warning light.

Figure 3:
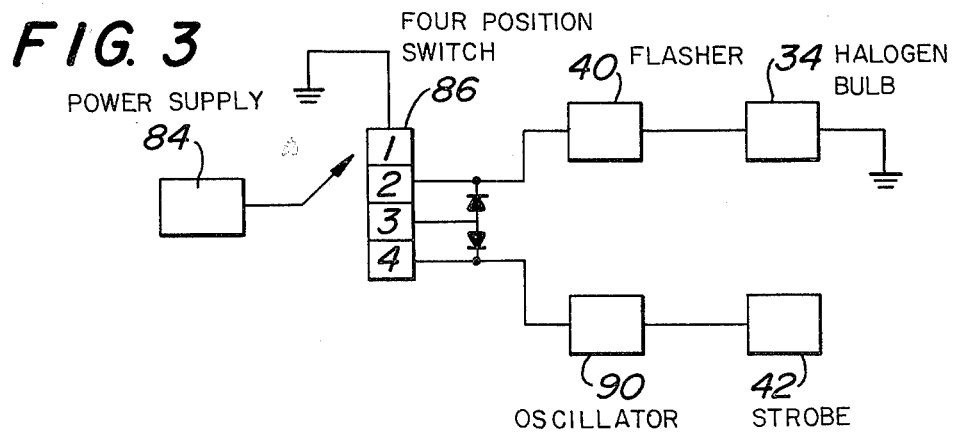
FIG. 3 is a schematic view of the circuit which is operative to energize the warning light.

Referring to FIG. 3, the schematic drawing of the circuit indicates that a suitable source of power 84 for the warning light which may be a 6 of 12-volt battery such as typically found in automobiles is connected to a four-position switch 86.

The first position of the switch is "OFF". The second position of the switch may be operative to energize the halogen cycle bulb while the fourth position of the switch may be operative to energize the strobe bulb. Intermediate switch position 3 may be suitably arranged, as by the diodes illustrated, for example, to provide power to both the halogen cycle bulb and the strobe bulb.

As illustrated in FIG. 3, the halogen cycle bulb circuit includes aforementioned element 40. This element comprises a flasher circuit which is operative to regulate the cycle of the bulb. The flasher is selected so that a second flash begins before the light from the first flash is extinguished to give the impression that the bulb is continuously energized but at varying intensities.

The cycle of the stroboscopic light 42 is controlled by a circuit that includes oscillator 90.

Since the circuits which control the halogen cycle and stroboscopic bulbs are not a part of the invention and are well-known in the art, further description of them is not necessary.

As best seen in FIGS. 1 and 3, when the circuit to the halogen tube is completed, it always provides light of varying intensity. It is mounted above plate 20 high enough to cast light onto the surface 14 on which the warning light is mounted. Thus, since the light remains on to some extent all the time, it provides a continuous outline of the vehicle and therefore provides a source of light which is useful for illuminating the immediate area around the vehicle at night while making the vehicle visible.

Since the bulb is lit all the time, it tends to have a calming effect on people as opposed to the upsetting effect that the flashing strobe has. Thus, while accomplishing the warning purposes, the two lights complement each other.

Further, as the need arises the switch 86 can be turned so that simply the halogen cycle bulb is energized, or the xenon strobe is energized or both of them are energized.

Thus, while the invention has been described with respect to one particular embodiment, it is apparent that other embodiments will be obvious to those skilled in the art in view of the foregoing description and drawings. Thus, the scope of the invention should not be limited by the foregoing, but rather, only by the scope of the claims appended hereto.

I claim:

1. In a warning light device of the type comprising first and second light sources mounted on a base with a translucent generally dome-shaped lens overlying said light sources and being supported by said base and means for energizing said first and second light sources, the improvement comprising means for flashing said first light so that a second flash is initiated before the light from a first flash is extinguished so that said first light source provides a continuous beam of light of variable intensity to continuously illuminate the area around said warning light, and means for causing said second light source to provide an intermittent beam of light.

2. A warning light of the type defined in claim 1 wherein said first light source comprises a first bulb containing a halogen gas, and said means for energizing said first and second light sources comprises a source of electrical power, and means for varying the power supplied to said first bulb so that the intensity at which said first bulb glows varies.

3. A warning light as defined in claim 2 wherein said second light source is a stroboscopic bulb, and means for selectively connecting said power source to said first or second bulbs or to both of them.

4. A warning light as defined in claims 3 or 1 wherein said lens is generally frustoconical in shape and has sides and a generally curved top wall, and said top wall comprises a frosted inner surface for reflecting light generated by said light sources back into said lens so that light that would be lost through said top wall is projected through the sides of said lens.

* * * * *